United States Patent [19]

Kleinberg

[11] Patent Number: 5,052,789
[45] Date of Patent: * Oct. 1, 1991

[54] MULTI-USER MICROSCOPE WITH ORIENTATION ADJUSTMENT AND METHOD

[75] Inventor: Larry K. Kleinberg, Toluca, Calif.

[73] Assignee: Storz Instrument Company, St. Louis, Mo.

[*] Notice: The portion of the term of this patent subsequent to Jul. 3, 2007 has been disclaimed.

[21] Appl. No.: 544,325

[22] Filed: Jun. 27, 1990

Related U.S. Application Data

[63] Continuation-in-part of Ser. No. 251,571, Sep. 30, 1988, Pat. No. 4,938,575.

[51] Int. Cl.⁵ .................... G02B 21/20; G02B 21/36
[52] U.S. Cl. .................................. 359/375; 359/377; 359/379
[58] Field of Search ............... 350/514, 516, 517, 508, 350/563, 518, 520

[56] References Cited

U.S. PATENT DOCUMENTS

| | | | |
|---|---|---|---|
| 3,418,034 | 12/1968 | Ambrose | 350/517 |
| 3,698,808 | 10/1972 | Delmas | 350/516 |
| 3,743,377 | 7/1973 | Rosenberger | 350/518 |
| 3,764,193 | 10/1973 | White | 350/518 |
| 3,796,220 | 3/1974 | Bredemeier | 350/516 |
| 3,997,239 | 12/1976 | Scherzer | 350/520 |
| 4,208,089 | 6/1980 | Netto | 350/518 |
| 4,448,498 | 5/1984 | Muller et al. | 350/516 |
| 4,763,968 | 8/1988 | Minami et al. | 350/517 |
| 4,938,575 | 7/1990 | Kleinberg et al. | 350/517 |

*Primary Examiner*—Bruce Y. Arnold
*Assistant Examiner*—Martin Lerner
*Attorney, Agent, or Firm*—Brooks & Kushman

[57] ABSTRACT

A stereoscopic microscope system having a primary and secondary viewing station which are rotatably positionable relative to one another for simultaneously viewing an object is disclosed. An objective lens focuses a plurality of rays of light aligned with a primary optic axis upon an object to be viewed. The light deflecting mechanism redirects a pair of rays of light from the objective lens orthogonally to form a diagonal optic axis spaced transversely from the primary optic axis. Both the primary and orthogonal optic axes extend perpendicular to an intersect a transverse optic axis extending therebetween. A second light deflecting mechanism redirects a pair of light rays in the orthogonal optic axis along a secondary viewing station optic axis spaced from and parallel to the transverse optic axis to be viewed by a secondary observer. A mechanism for stretching or compressing a passive light in the orthogonal axis as a secondary viewing station is rotated is provided. A mechanism for rotating the images of the object viewed at the secondary viewing station automatically compensates for image rotation which occurs when the primary viewing station is rotated relative to the secondary viewing station.

11 Claims, 10 Drawing Sheets

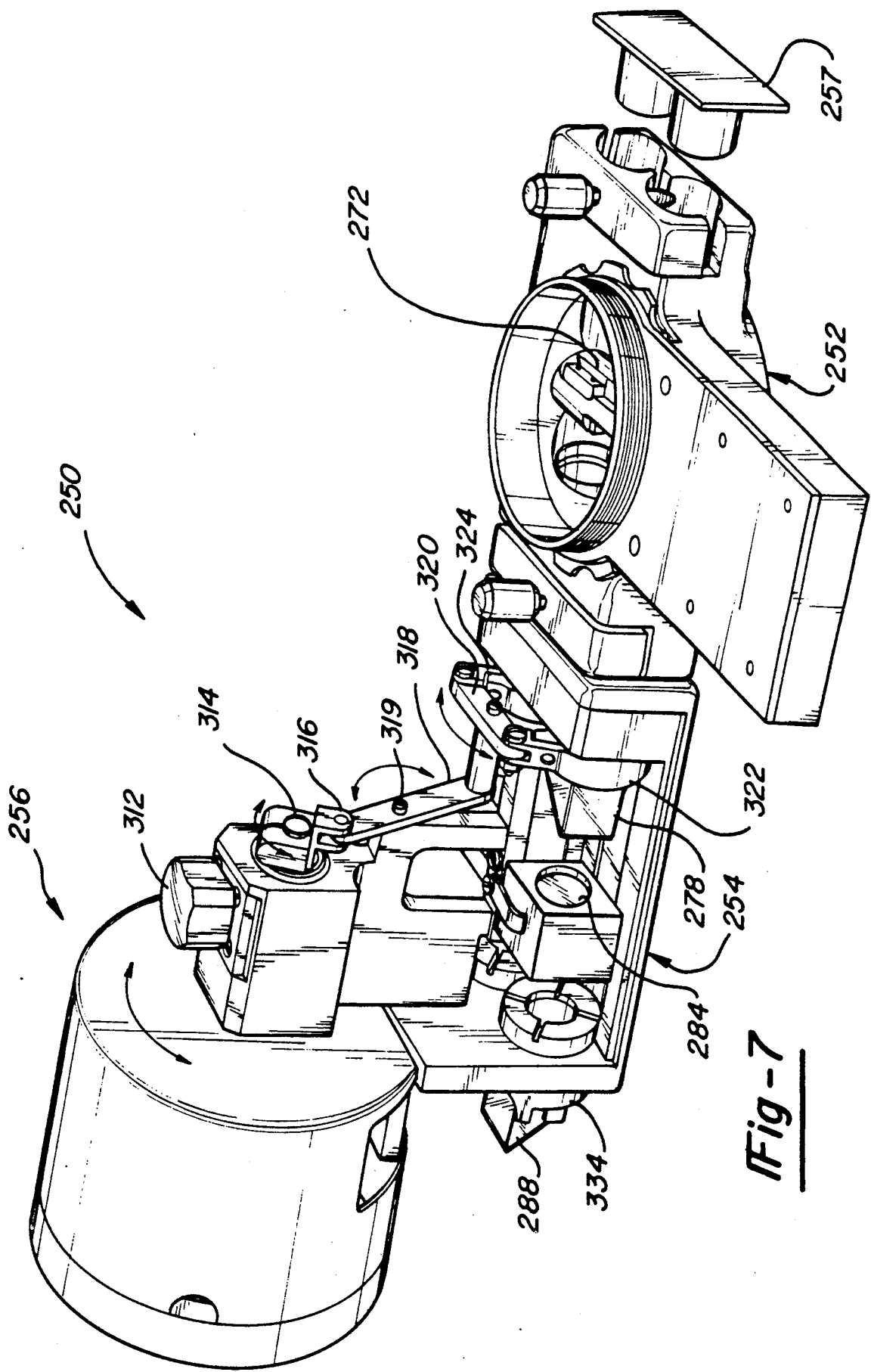

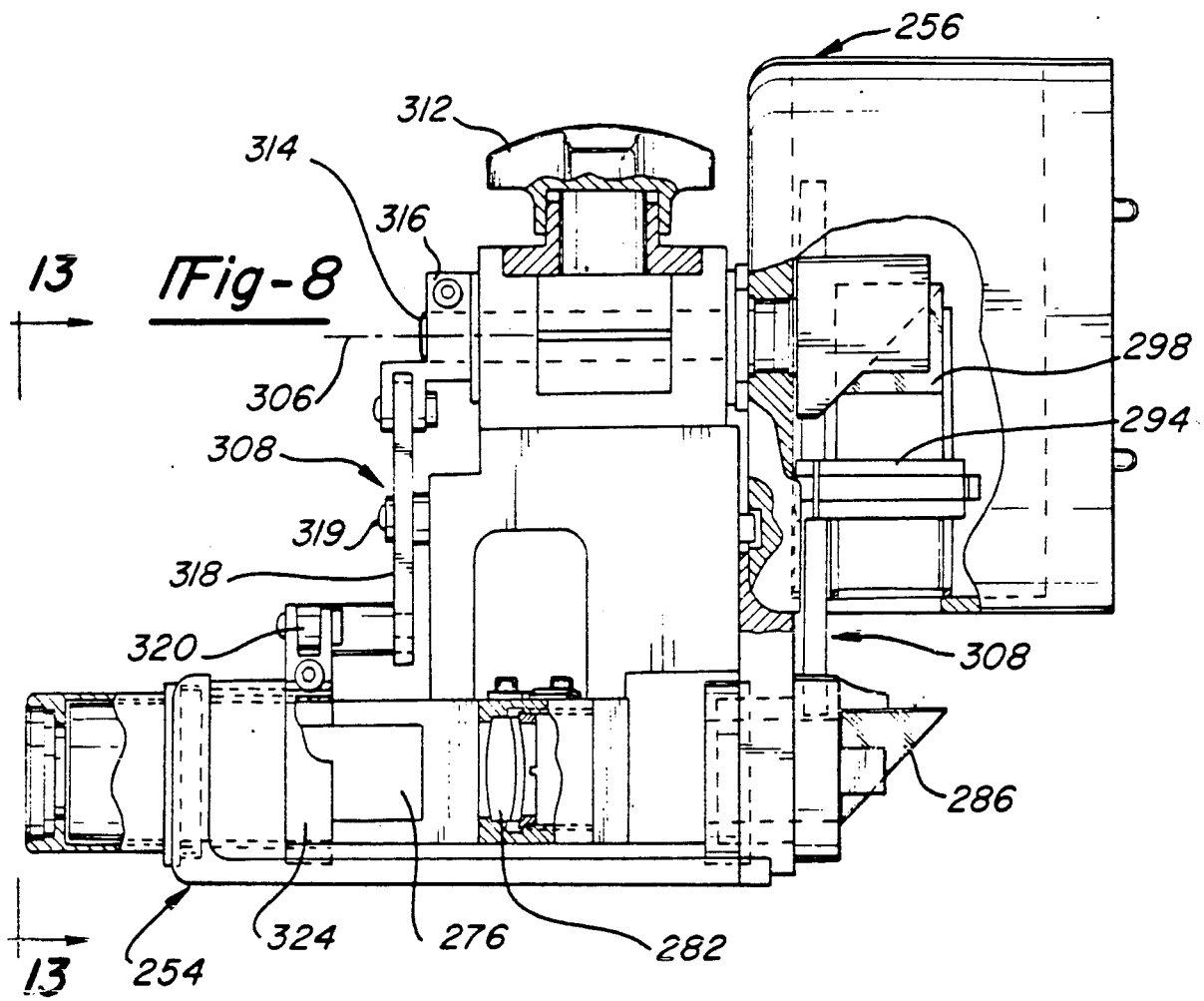
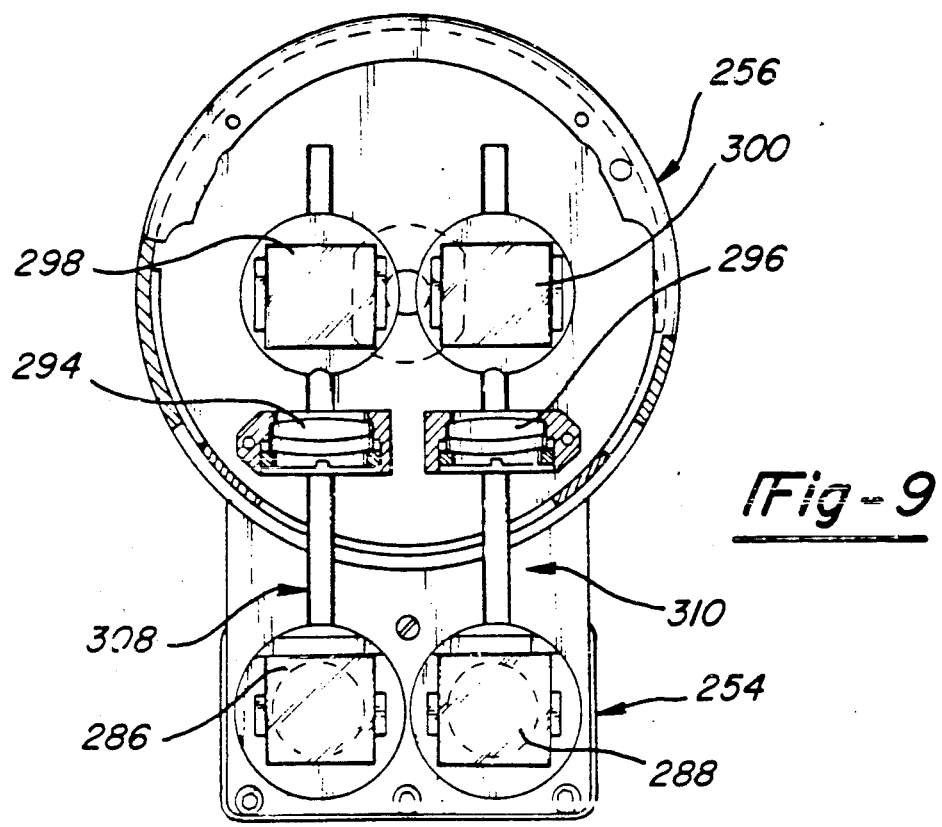

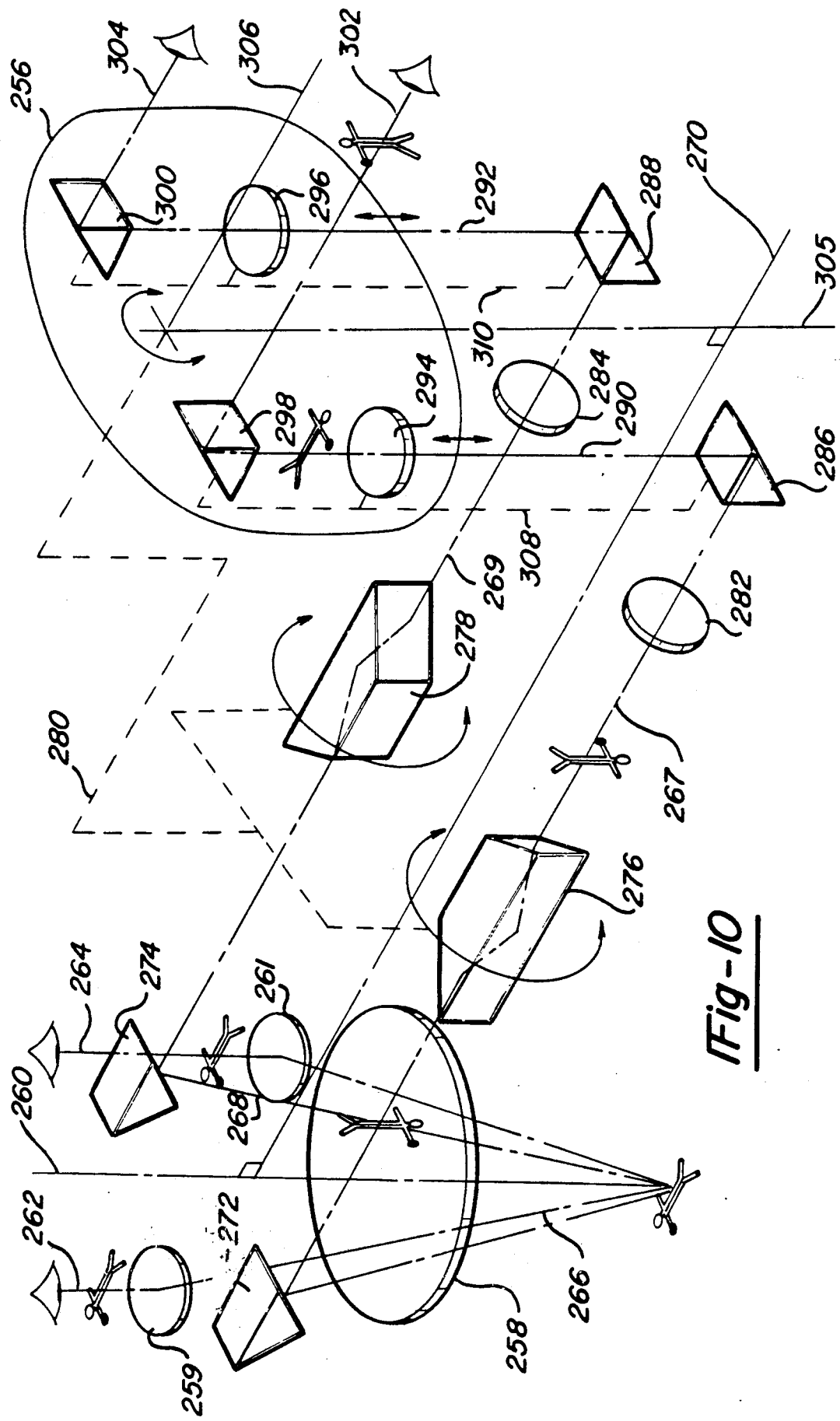

MULTI-USER MICROSCOPE WITH ORIENTATION ADJUSTMENT AND METHOD

RELATED APPLICATIONS

This is a continuation in part of copending U.S. application 251,571 entitled "Microscope System and Attachment" filed Sept 30, 1988, now U.S. Pat. No. 4,938,575, issued July 3, 1990.

TECHNICAL FIELD

The present invention relates to microscopes adapted primarily for surgical procedures, more particularly to microscopes having two viewing stations.

BACKGROUND ART

In the practice of ophthalmology, assistant surgeons, nurses, students, and other technical personnel are involved with the primary surgeon during the performance of surgical procedures upon the eye, or upon any other generally relatively flat surface or tissue to be treated. As a result, a particular image must be observed by the primary surgeon and the assistant with a single microscope.

Referring to FIG. 1, an example of a microscope system to observe an image by the primary surgeon and assistant is shown. This microscope system consists of two independent microscopes with identical optical axes below a common beam splitter 1. The primary surgeon views the image through the main microscope 2 which passes through the common beam splitter 1. The assistant views the image through the assistant's microscope 3 which passes through the common beam splitter 1 and an internal focus 4. The image is reflected by mirror 5 and passes through the 3-step magnification changer 6 in the tube 7 of the assistant's microscope 3.

One disadvantage with the above microscope system is that a beam or ray of light must be split by a beam splitter. This results in a greater light loss to both the primary surgeon and the assistant.

It is, therefore, one object of the present invention to provide a microscope system which allows a primary and secondary observer to simultaneously view the same image.

It is another object of the present invention to provide at least two station viewing without the use of beam splitters.

It is a further object of the present invention to allow the secondary observer to manipulate his or her binocular so that the binocular is always parallel to the image while the microscope is at an oblique angle to the image.

Another object of the present invention is to provide an apparatus and method to enable the secondary observer in a multiple observer microscope to independently position the binocular relative to the microscope while maintaining the horizon in alignment.

DISCLOSURE OF THE INVENTION

Accordingly, the present invention is a microscope system including an objective lens common to at least two paths of light rays from an image to be viewed and prism means for re-directing at least one of the light rays in a direction orthogonal to the other of the light rays which travels to a first viewing station. An optical focus means is provided in alignment with the orthogonal light ray for magnifying the orthogonal light ray. A plurality of prisms being rotatable are provided for redirecting the orthogonal light ray to a second viewing station which is always parallel to the image.

One advantage of the present invention is that the assistant who sits 90 degrees to the primary surgeon can manipulate his binocular so that it is always parallel to the image and the microscope can be at an oblique angle to the image. Another advantage of the present invention is that the microscope system will allow for an angular deviation while maintaining correct image orientation. A further advantage of the present invention is that the use of beam splitters are eliminated. A still further advantage of the present invention is that a greater amount of light is provided to both the primary surgeon and the assistant.

Other advantages of the present invention will be readily appreciated as the same becomes better understood by reference to the following detailed description when considered in connection with the accompanying drawings.

BRIEF DESCRIPTION OF THE DRAWINGS

FIG. 7 is a perspective view of a second embodiment of the invention;

FIG. 8 is a partially cut away side elevation of the FIG. 7 embodiment;

FIG. 9 is a partially cut away end view of the FIG. 7 embodiment;

FIG. 10 is a schematic illustration of the optic system of the assistant's microscope illustrating image position;

BEST MODES FOR CARRYING OUT THE INVENTION

First Embodiment

Figure 1:
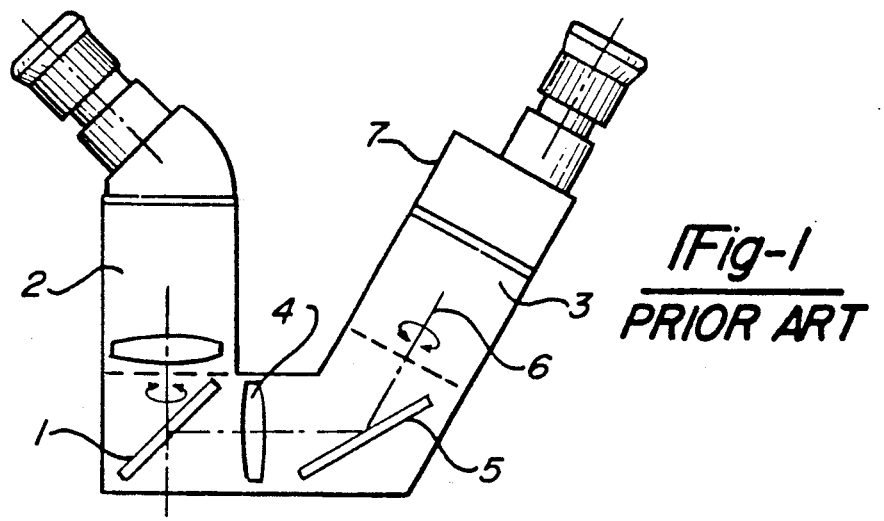
FIG. 1 is an elevational view of a prior art microscope system.
Figure 2:
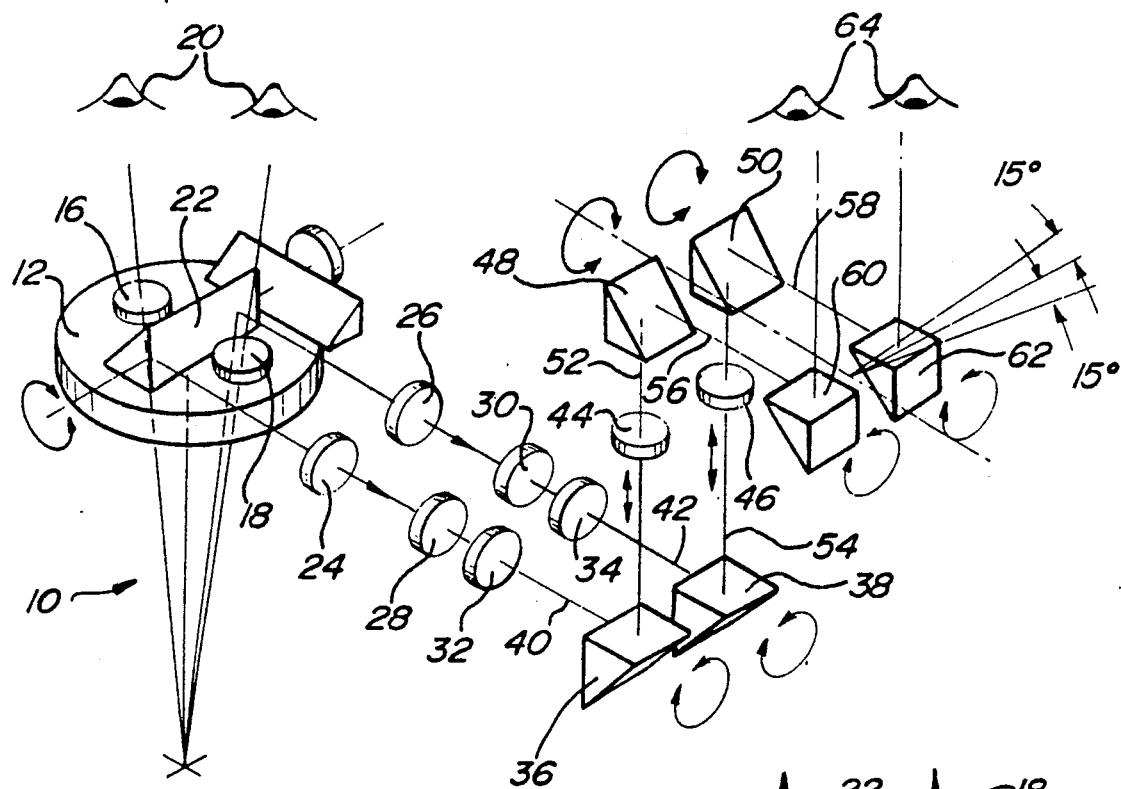
FIG. 2 is a schematic diagram of a network of optical elements or prisms forming the microscope system according to the present invention.

Referring to FIG. 2, a schematic diagram of the optical elements of the microscope system 10 according to the present invention is shown. The microscope system 10 includes a common objective lens 12 in spaced relationship to an image 14 to be viewed. A typical objective lens may be found in U.S. Pat. No. 4,688,907, issued Aug. 25, 1987, in the name of Larry K. Kleinberg, which is hereby incorporated by reference. A pair of laterally spaced lenses 16 and 18 are disposed vertically above the objective lens 12. A pair of a primary observer's eyes 20, such as those of the primary surgeon, view the image 14 by rays of light which pass through the objective lens 12 and lenses 16 and 18 to the primary observer's eyes 20.

The microscope system 10 also includes a generally triangular right angle prism 22 disposed adjacent the objective lens 12. The prism 22 is rotatable about is longitudinal axis for a total angle of approximately ninety (90) degrees. The prism 22 redirects the rays of light from the image 14 at ninety (90) degrees in the unused portion of the objective lens 12. In other words, the rays of light from the image 14 are redirected by the prism 22 perpendicular to the rays of light passing to the primary observer's eyes 20. The microscope system 10 includes a first pair of lenses 24 and 26 disposed laterally of the prism 22. A second pair of lenses 28 and 30 are laterally spaced from the first pair of lenses 24 and 26. A third pair of lenses 32 and 34 are spaced laterally of the second pair of lenses 28 and 30. Lenses 24, 26, and 28, 30 and 32, 34 are used to orientate or flip the image 14 for proper viewing. These lenses also act as an internal focus and provide for one to one optics at the viewing site and are commonly referred to as "infinity systems."

The microscope system 10 further includes a first pair of generally triangular right angle prisms 36 and 38 disposed laterally of the third pair of lenses 32 and 34. The first pair of prisms 36 and 38 rotate about lateral axes 40 and 42 as indicated by the arrows in the figure. Lenses 24, 26, 28, 30, 32, 34 and prisms 36 are spaced along axes 40 and 42, respectively. A fourth pair of lenses 44 and 46 are spaced vertically above the first pair of prisms 36 and 38. A second pair of generally triangular right angle prisms 48 and 50 are spaced vertically above the fourth pair of lenses 44 and 46. The second pair of prisms 48 and 50 and the fourth pair of lenses 44 and 46 are spaced along vertical axes 52 and 54, respectively. A third pair of prisms 60 and 62 are spaced along the axes 56 and 58 from the second pair of prisms 48 and 50. The third pair of prisms 60 and 62 rotate about axes 56 and 58, respectively, as indicated by the arrows in the figure approximately 15 degrees in each direction for a total angle of 30 degrees of articulation. A pair of secondary observer's eyes 64 are disposed vertically above the third pair of prisms 60 and 62 for viewing the image 14.

In operation, the observer's eyes 64 view the image 14 which passes through the objective lenses 12, prism 22, lenses 24, 26, 28, 30, 32, 34, prisms 36, 38, lenses 44, 46 and prisms 48, 50, 60, 62 to the observer's eyes 64. The secondary observer who sits 90 degrees to the primary observer may manipulate his or her binocular so that it is always parallel to the image 14. This is accomplished by making the prisms 36, 38, 60, 62 rotate around their optical axes 40, 42, 56, 58 as indicated by the arrows in the figure. The optical path is also stretched and compressed as indicated by the arrows in the figure. The microscope system 10 allows for an angular deviation while maintaining correct image orientation. Since no beam splitting is required, there is a lesser degree of light loss to the primary observer's eyes 20 with more light provided to the secondary observer's eyes 64. Both observer's eyes 20 and 64 see the image 14 in full stereo view with no view angle differences.

Figure 3:
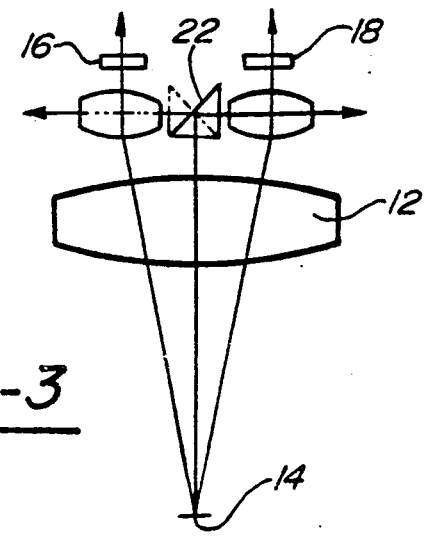
FIG. 3 is a front view of the schematic diagram of FIG. 2.

Referring to FIG. 3, a front view of the optical elements for the primary observer is shown. These optical elements are embodied in a housing to allow them to be optionally attached on either side of a conventional microscope (not shown, but see FIG. 14).

Figure 4:
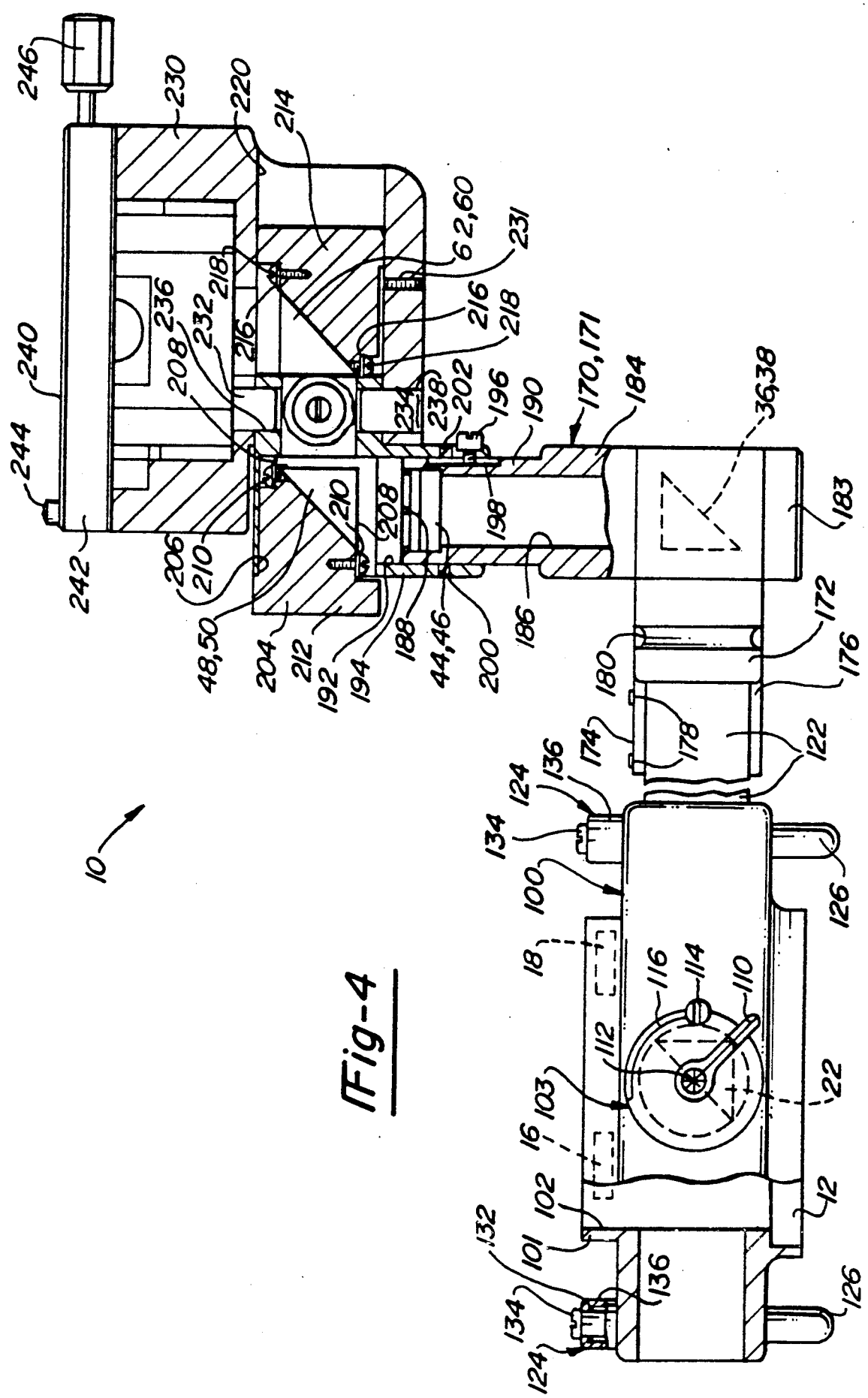
FIG. 4 is a front elevational view with portions broken away of a microscope system according to the present invention.
Figure 5:
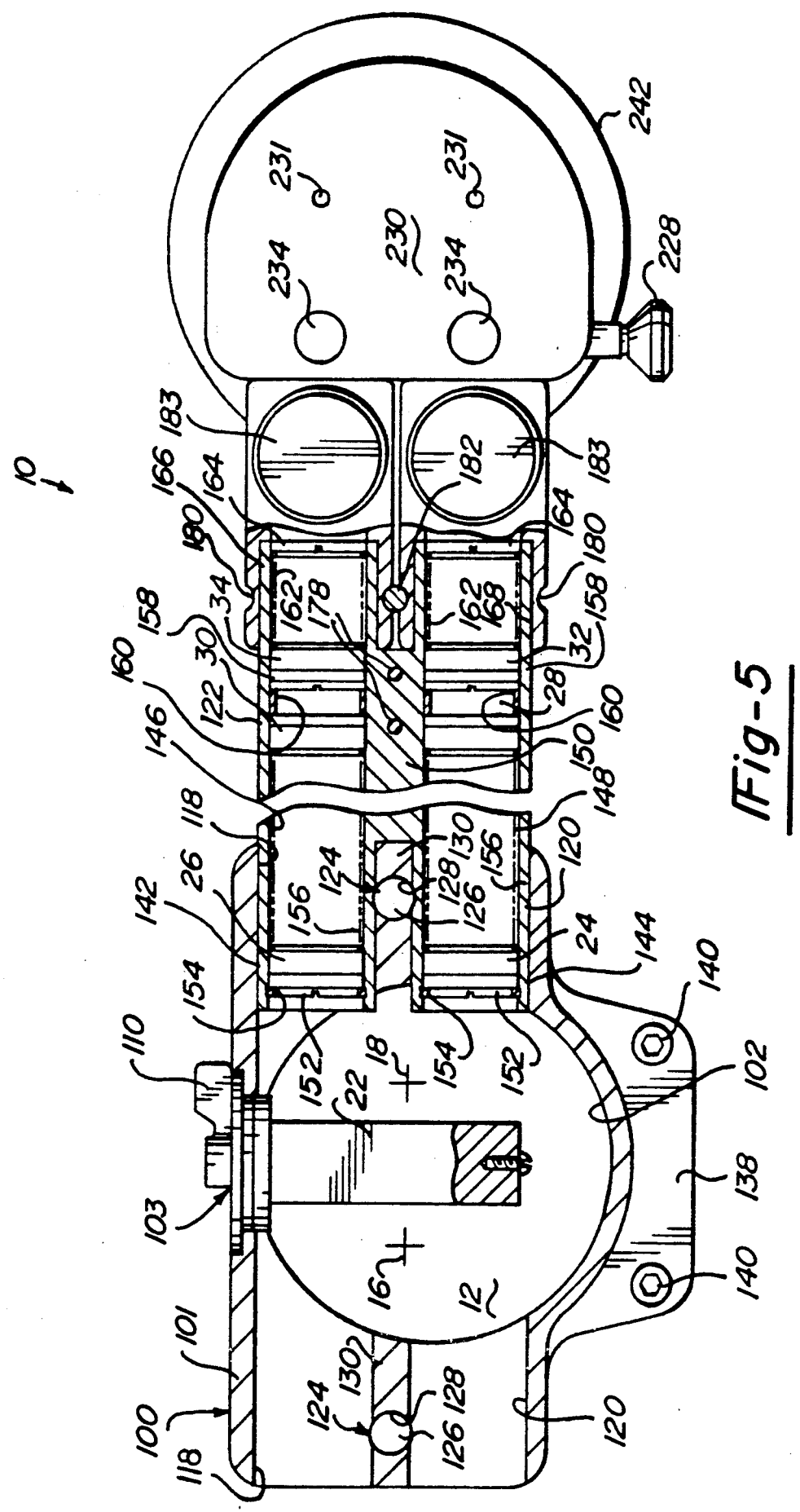
FIG. 5 is a plan view with portions taken away of the microscope system of FIG. 4.
Figure 6:
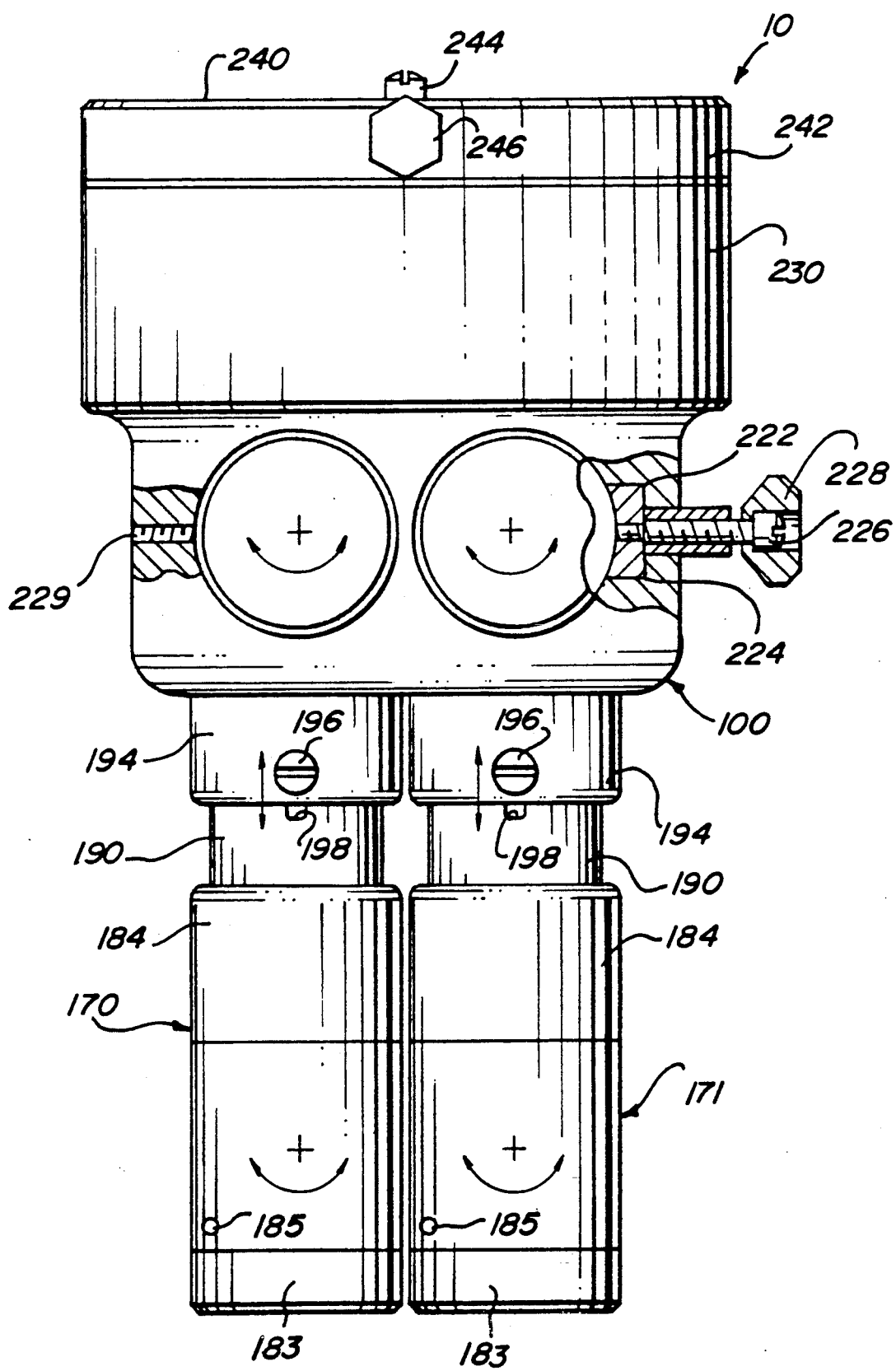
FIG. 6 is a side elevational view with portions broken away of the microscope system of FIG. 4.

Referring to FIGS. 4, 5, and 6, the microscope system 10 is embodied in a zero (0) to ninety (90) degree stereo attachment, generally indicated at 100. The attachment 100 includes a primary housing 101 for containing and supporting the objective lens 12. The objective lens 12 is disposed in a generally circular aperture 102 formed in the primary housing 101 and secured therein by screwing the objective lens 12 into the primary housing 101 in a known manner. A prism holder generally indicated at 103 supports the prism 22 adjacent the objective lens 12 within the primary housing 101. The prism 22 is secured to the prism holder 103 by an adhesive such as epoxy. A lever 110 is connected by a first fastener 112 to the prism holder 103. The primary observer grasps the lever 110 to rotate the prism 22 about its longitudinal axis. A second fastener 114 is spaced laterally of the fastener 112 and prevents movement of the prism holder 103 longitudinally and secures it in the primary housing 101. The prism holder 103 has a recessed portion 116 that cooperates with the fastener 114 which also acts as a stop to limit the rotation of the prism 22.

The primary housing 101 includes a pair of spaced passageways 118 and 120 communicating diametrically through the primary housing 101. The passageways 118 and 120 allow either side of the primary housing 101 to be secured to an extension housing 122. A locking mechanism generally indicated at 124 releasably locks the primary housing 101 to the extension housing 122. The locking mechanism comprises a spring loaded pin 126 communicating vertically through an aperture 128 formed in a wall 130 of the primary housing 101 separating the passageways 118 and 120. The pin 126 has an undercut (not shown) which operatively cooperates with the extension housing 122 to lock the primary housing 101 in place. A spring 132 is disposed about one end of a fastener 134 secured to the primary housing 101. The spring 132 is confined by a spring retainer 136 at one end and abuts the undercut on the pin 126. The pin 126 is depressed which compresses the spring 132 to allow the primary housing 101 to be removed from the extension housing 122. The process is reversed for locking the primary housing 101 to the extension housing 122.

As illustrated in FIG. 5, the primary housing 101 has an outwardly extending flange 138. A pair of fasteners 140 such as cap screws are disposed in corresponding apertures (not shown) of the flange 138. The flange 138 allows the attachment 100 to be secured within an existing microscope or allow additions to be secured in the future.

The extension housing 122 is generally rectangular and has generally circular extensions 142 and 144 at one end disposed in the passageways 118 and 120, respectively, of the primary housing 101. The extension housing 122 forms a pair of spaced generally circular passageways 146 and 148 therein separated by a wall 150 of the extension housing 122. A first lock ring 152 being generally circular is disposed in a corresponding groove 154 in each passageway 146 and 148 at one end. The first pair of lenses 24 and 26 are disposed in the passageways 146 and 148, respectively. A lens spring 156 is disposed in the passageway between the first pair of lenses 24, 26 and the second pair of lenses 28, 30 which are also disposed in the passageways 146 and 148, respectively. A second lock ring 158 is also disposed in the passageways 146 and 148 on the other side of the second pair of lenses 28 and 30. A spacer 160 is disposed in the passageways 146 and 148 and abuts the second lock ring 158 to provide an air gap between the lenses 28 and 30 and the second lock ring 158 in the passageways 146 and 148. The third pair of lenses 32 and 34 are also disposed in the passageways 146 and 148 on the other side of the second lock rings 160. A lens spring 162 is disposed between the third pair of lenses 32 and 34 and a third pair of lock rings 164 at the other end of the passageways 146 and 148 for adjustment reasons, e.g. to compress or extend the lens spring 162 for focusing. The extension housing 122 has generally circular extensions 166 and 168 formed at the other end and similar to extensions 142 and 144.

The attachment 100 further includes a pair of generally "L" shaped extensions 170 and 171 having a horizontal portion 172 disposed about extensions 166 and 168 of the extension housing 122. An upper pivot plate 174 and a lower pivot plate 176 are connected to and disposed about the extension housing 122. A pair of fasteners 178 secure the pivot plates 174 and 176 to the extension housing 122.

The longitudinal portion 172 includes a semicircular groove 180 about the circumference thereof. A pivot pin 182 which acts a bearing is disposed between the pair of L-shaped extensions 170 and 171 in the groove 180. The upper 174 and lower 176 pivot plates secure the pivot pin 182 between them and prevent its movement. The horizontal portion 172 of the pair of L-shaped extensions 170 and 171 rotate or pivot about the extensions 166 and 168, respectively, of the extension housing 122. Each horizontal portion 170 has a prism 36, 38 mounted to a prism mount 183 which is generally circular in shape and disposed within a passageway 186 of a vertical portion 184 of the L-shaped extensions 170 and 171. The prism mounts 183 are secured to the vertical portion 184 by set screws 185. The lenses 44 and 46 are disposed in the passageway 186 at the other end and are held in place by a fourth lock ring 188. The vertical portion 184 includes a necked-down portion 190 partially disposed in an aperture 192 formed in one end of a generally L-shaped lens housing 194. The lens housing 194 includes a fastener 196 cooperating with a slot 198 formed in the necked-down portion 190 which acts as a slide stop to limit the vertical movement between the necked-down portion 190 and the lens housing 194. The fastener 196 also prevents separation between the L-shaped extensions 170 and 171 and lens housing 194. An 0-ring 200 is disposed in a corresponding groove 202 of the lens housing 194 to sealingly engage the necked-down portion 190. The optical path can be stretched or compressed by relative movement between the vertical portion 184 and the lens housing 194.

A first prism mount 204 is disposed in a generally circular aperture 206 of the lens housing 194. The prisms 48 and 50 are secured to the prism mount 204 by a clamp or washer 208 and a corresponding fastener 210. The prism mounts 204 are secured to the lens housing 194 by set screws (not shown). The prisms 60 and 62 are secured to prism mounts 214 by a clamp 216 and corresponding fastener 218. The prism mounts 214 are generally circular in shape and are disposed in corresponding apertures 220 of the base housing 230. The prism mounts 214 are secured to the base housing 230 by set screws 231 which engage the prism mount 214 and prevent any relative movement between it and the base housing 230.

A stop 222 engages the lens housing 194 and is disposed in a corresponding aperture 224 of the base housing 230. A fastener 226 engages the stop 222. A lock screw 228 is disposed about the fastener 226. The lock screw 228 is then grasped by the secondary observer and pivoted or rotated to operatively lock the base housing 230 in position relative to the lens housing 194 and to disengage the stop 222 from the lens housing 194. A set screw 229 or a stop, fastener and lock screw arrangement may be used on the other side of the base housing 230 to lock it to the other lens housing 194.

The base housing 230 operatively cooperates with the lens housing 194. The base housing 230 includes an upper 232 and lower 234 stop pin partially disposed in corresponding annular groove 236 of the lens housing 194. The stop pins 232 and 234 allow the base housing 230 to rotate about the lens housing 194 in the annular groove 236 for an articulated fifteen (15) degrees in either direction. Hence, the prisms 60 and 62 rotate relative to prisms 48 and 50. A mask 240 conventionally known in the art is disposed within a binocular ring 242 on the upper side of the base housing 230. Fasteners 244 secure the mask 240 and binocular ring 242 to the base housing 230. A clamp screw 246 extends outwardly from the ring 242 and secures the ring 242 to the mask 240.

In operation, the primary housing 101 is above an image to be viewed. The light rays from the image 14 pass through the objective lens 12 and lenses 16 and 18 to the primary observer's eyes 20. Simultaneously, light rays from the image 14 pass through the prism 22 orthogonal to the light rays to the primary observer's eyes. If the primary housing 101 has one side or the other attached to the remaining portion of the attachment 100, the prism 22 may have to be rotated ninety (90) degrees by displacing the lever 110.

The light rays from the prism 22 travel through passageways 146 and 148 and lenses, 24, 26, 28, 30, 32 and 34 in the extension housing 122. The light ray is focused by these lenses as previously described. The light rays then travel to prisms 36 and 38. The L-shaped extensions 170 and 171 to which prism mounts 183 and prisms 36 and 38 are attached may be rotated about axes 40 and 42 if necessary. The light rays then travel through the passageways 186 in the vertical portion 184 of the L-shaped extensions 170 and 171 and through lenses 44 and 46. The light rays then travel to prisms 48 and 50 which are secured to prism mounts 204.

Prism mounts 204 are rotated by displacing or rotating the L-shaped extensions 170 and 171. This causes one of the vertical portions 184 to move relative to its lens housing 194 and the other vertical portion 184 to move relative away from its lens housing 194 in a piston-like manner similar to pistons in an engine. Hence, one of the optical paths of axes 52 and 54 is compressed while the other is stretched. The light then travels through prisms 60 and 62 which may be rotated about axes 56 and 58 when the base housing 230 is rotated relative to the lens housing 194 in either direction about axes 56 and 58. The base housing 230 is then locked in place by lock screw 228. The light rays then pass through corresponding apertures in the mask 240 to the secondary observer's eyes 64. The mask 240 can remain parallel to the image or floor. It should be appreciated that the base housing 230 may be rotated more than fifteen (15) degrees in either direction.

Second Embodiment

A second embodiment of the invention is illustrated in FIGS. 7-13. Auxiliary viewing station attachment 250 functions generally similar to viewing station attachment 100 described previously. Viewing station attachment 250 is made up of a fixed housing 252, a removable secondary viewing station frame 254, and a rotatable housing 256. The housing 256 preferably has a cover (not shown) on it to protect the lenses and other members. The secondary viewing station frame 254 may alternatively be affixed to either the right or left side of housing 252 so that the person utilizing the second view station can be positioned alternatively on the right or left side of the primary viewing station in a manner similar to that described with reference to the first embodiment.

It should be appreciated that if desired two secondary viewing stations may be affixed to a single microscope to allow two observers. In most instances where there is only a single secondary viewing station, a plug 257 will be utilized to seal the apertures in the fixed housing 254 which are not in use.

A schematic illustration of the light paths in the primary and secondary viewing stations is illustrated in FIG. 10. Objective lens 258 is generally oriented perpendicular to and within primary optic axis 260. Objective lens 258 focuses plurality of light rays extending generally parallel to the primary optic axis upon the object to be viewed. For illustration purposes, a standard "stickman" character with a solid circular right hand is used so that the orientation of the image can be shown at various positions along the light paths.

The primary binocular viewing station will view the reference object along primary light paths 262 and 264 which extend generally parallel to primary optic axis 260. A pair of lenses or lens systems 259, 261 are positioned between the objective lens 258 and the primary observer's eye pieces. As illustrated by the stickman image in path 262, the primary user observes the image in proper alignment. In the preferred embodiment, objective lens 258 is sufficiently large so that a pair of secondary light paths 266 and 268 can be directed through the objective lens without the use of beam splitters and the inherent light loss associated therewith.

Secondary light paths 266 and 268 are reflected transversely along a transverse optic axis 270 which extends generally perpendicular to primary axis 260. Secondary light path transverse segments 267 and 269 are reflected 90 degrees by a pair of mirrors 272 and 274. Each mirror is provided with two reflective surfaces, one oriented toward the right side of the housing and one oriented toward the left side of the housing so as to enable the secondary viewing station frame 254 to be affixed to either side of the fixed housing 252 without necessitating the movement of the mirror. Of course, a right triangle prism or a movable mirror could alternatively be used in place of mirrors 272 and 274 to provide means for redirecting the secondary pair of light paths.

The secondary pair of light path segments 267 and 269 extend parallel to transverse axis 270 and pass through a pair of dove prisms 276 and 278. The dove prisms provide a means for rotating the images of the object viewed at the secondary binocular viewing station to compensate for image rotation which occurs when the first and second viewing stations are rotated relative to one another.

It should be appreciated that although the dove prism is the preferred optic element for providing a means for rotating the image, alternative optic elements such as a pechan prism or a reversion prism can be used. The dove pechan and reversion prisms are described in the Handbook of Optics, Copyright 1978, published by McGraw-Hill, Inc., specifically, chapter 2, section 39, pages 2-41 to 2-51, which are incorporated by reference herein. Note that the dove, pechan and reversion prisms each rotate the image at twice the angular rate at which the prism is rotated. These prisms convert the image without deviation or displacement of the beam of light.

Dove prisms 276 and 278 are rotated in unison as the rotatable housing 256 is rotated relative to frame 254 by a mechanical linkage illustrated by dashed line 280 in FIG. 10. (The details of mechanical linkage 280 are described in more detail below with reference to FIGS. 7, 8 and 13.) Mechanical linkage 280 is such that a two degree rotation of rotatably housing 256 relative to frame 254 causes a one degree rotation of the dove prisms in the same direction automatically realigning the image observed by the secondary viewer. The mechanical linkage 280 and the dove prisms 278 and 278 together provide means for rotating the images of the object viewed at the second viewing station to compensate for the image rotation which occurs when the primary and secondary viewing stations are rotated relative to one another.

In FIG. 10, the image of the stickman character is shown along the secondary light path 266 before entry and after exiting dove prism 276. Note that the image is inverted, i.e., a mirror image as indicated by the orientation of the stickman's right hand. Oriented within each of the secondary light path segments 267 and 269 are lenses 282 and 284, respectively. The light exiting lenses 282 and 284 is deflecting 90 degrees by right triangular prisms 286 and 288 to form orthogonal light path segments 290 and 292, respectively. Mirrors 272 and 274 in combination with right triangular prisms 286 and 288 collectively provide first light deflecting means for redirecting the pair of rays of light from the objective lens orthogonally. The pair of light rays once deflected extend in general alignment with an orthogonal optic axis spaced transversely from the primary optic axis 260.

The primary optic axis 260 and the orthogonal optic axis 305 are both perpendicular to the transverse optic axis 270. Since the microscope system is binocular, there are separate light paths for each eye of the observer at the secondary station. Each of the pair of secondary light paths has a series of segments which are spaced from and generally aligned with the primary optic axis 260, the transverse optic axis 270, the orthogonal optic axis 305 and the viewing station optic axis 306. The orientation of the image in each light path in each set of parallel light paths is the same.

Oriented within the orthogonal light path segments 290 and 292 are a pair of lenses 294 and 296 which focus and direct the light beam upon the right triangular prisms 298 and 300, which deflect the light paths transversely to the eyes of the secondary observer. The stickman image seen by this secondary observer corresponds directly with that seen by the primary observer. Right triangular prisms 298 and 300 provide a second light deflecting means which cooperates with the secondary viewing station for redirecting the pair of light rays in the orthogonal optic axis along the secondary viewing station optic axis. The second light deflecting means is rotatable about viewing station optic axis 306 as rotatable housing 256 is turned relative to frame 254. The secondary optic axis 306 is spaced from and parallel to transverse optic axis 270 to allow for free relative rotation of the secondary viewing station relative to the primary viewing station through a limited range of approximately plus or minus 40 degrees.

In the embodiment illustrated, light paths 302 and 304 are parallel to the axis of the housing 206. It should be appreciated that these light paths can be deflected upward by an additional optic element or appropriate eye pieces to suit the particular microscope application. In the embodiment illustrated, light path segments 302 and 304 are parallel to the secondary viewing station axis 306 and spaced apart and parallel to the transverse optic axis 270.

As housing 256 rotates relative to frame 254, it is necessary to maintain the right triangular prism 286, lens 290 and right triangular prism 298 in proper alignment at all times. Similarly, prism 288, lens 296 and prism 300 must be maintained in alignment with vertical axis 292 as the housing rotates. Alignment of the optic elements in the vertical light paths 290 and 292 are maintained by a mechanical alignment linkage 308 and 310, illustrated in dotted outline in FIG. 10. (The details of the preferred embodiment of the linkage 308 and 310 are discussed below.)

Mechanical alignment linkage 308 and 310 provide a means for compressing or stretching the passive light in the orthogonal axis as the secondary viewing station is rotated. It should also be appreciated that a mechanism similar to that utilized in the first embodiment of the invention could alternatively be used to achieve the same function, i.e., to maintain the optic elements in proper alignment as secondary light path segments 290 and 292 are compressed or stretched in response to the rotation of housing 256.

In FIGS. 7-9 and 11-13, the frame 254 and rotatable housing 256 assembly are shown in greater detail. Rotatable housing 256 is pivotably connected to frame 254 and can be locked in various angular orientations by lock mechanism 312. Shaft 314 is affixed to a rotary housing 256 and pivotably cooperates with frame 254 when locking mechanism 312 is in the free position and retains the rotatable housing 256 to the frame when the locking mechanism is in the locked position. Affixed to the end of shaft 314 is arm 316. Arm 316 is pivotably connected to lever 318 which is pivotably supported by the frame on a central pivot point 319. The opposite end of lever 318 passes to a yolk 320 pivotably coupled to dove prism retainers 322 and 324. The location of the pivotable connection between the yolk 320 and the dove prism retainer is spaced from the second light path a distance relative to the length of arm 316 so that the dove prisms rotate an angular amount which is equal to one-half of the rotation of rotatable housing 256 since the dove prism inherently rotates an image at twice the angular rate of the prism.

Figure 11:
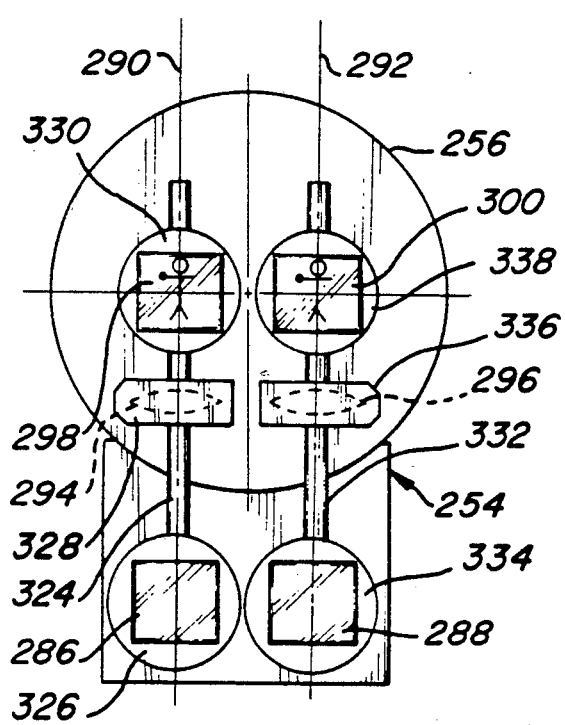
FIG. 11 is a right end view of the assistance microscope illustrating image position when the assistance microscope is generally vertical.
Figure 12:
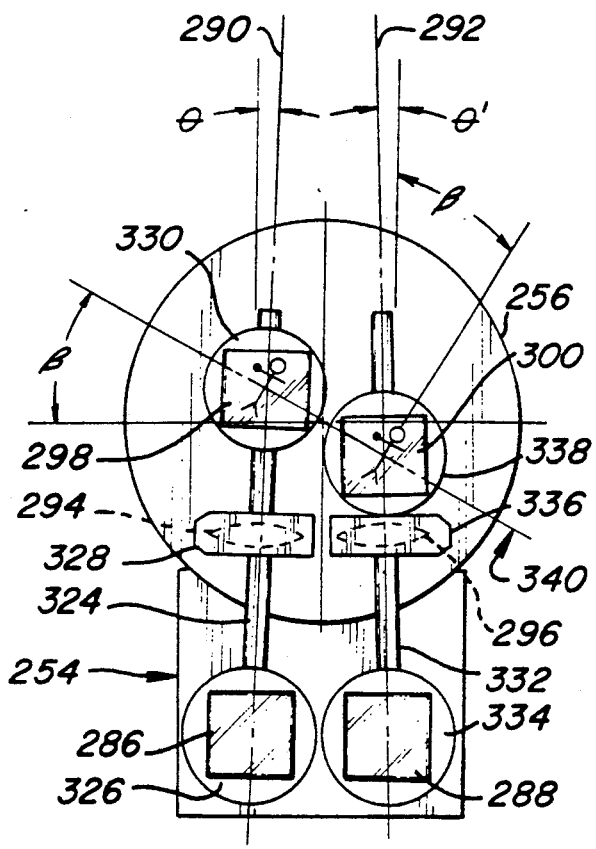
FIG. 12 is a right side view of the assistance microscope showing an image position when the microscope housing is rotated.
Figure 13:
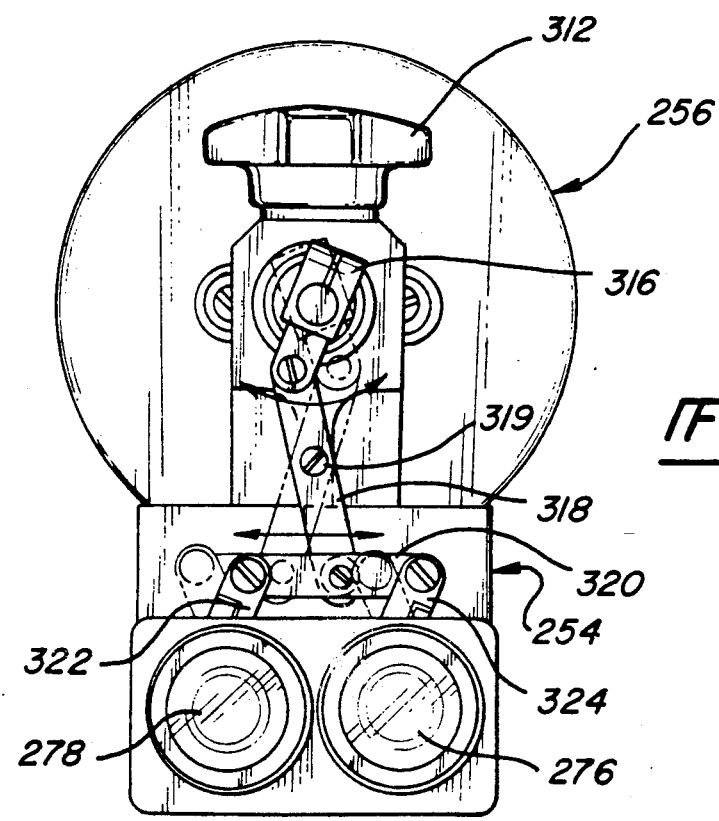
FIG. 13 is a left end view of the assistance microscope.

In FIGS. 11 and 12, the stickman image seen by the secondary observer is illustrated with the rotary housing 256 in two orientations. In FIG. 11, a primary axis of the microscope 260 is vertical and right triangular prisms 298 and 300 are spaced apart and adjacent to one another. Prism 286 and lens 294 are aligned along guide shaft 324. Guide shaft 324 maintains the right triangular prisms and the lens in proper alignment. Lens 286 is retained in a bushing 326 pivotably mounted in frame 254. Shaft 224 is affixed to bushing 326. Shaft 324 slidably extends through lens holder 328 which retains lens 294 oriented perpendicular to axis 290. Shaft 324 extends slidably through bushing 330.

When the rotary housing 256 is turned relative to frame 254 as illustrated in FIG. 12, bushing 330 rotates with the housing about the center line of housing rotation and rotates in the opposite direction relative to the housing in an amount sufficient to maintain prism 298 in proper alignment with prism 286. Note that when the rotary housing 256 is turned clockwise a distance $\beta$, light paths axis 290 and 292 rotate a distance $\Theta$ and $\Theta'$, respectively, in order to maintain the prisms in alignment. Lens holder 328 and lens 294 carried thereby, shift inwardly as well in order to maintain the lens in the center of the light path. The optic system associated with the user's right eye, namely, prism 288, lens 296 and prism 300 is aligned by a similar mechanism made up of shaft 332, bushing 334, lens holder 336 and bushing 338 which correspond respectively to shaft 324, bushing 326, lens holder 328 and bushing 333 described previously.

With the embodiment shown in FIGS. 7-13, the housing 256 can be rotated 40° in either direction, or a total of 80°.

As illustrated in FIG. 12 when the rotatable housing 256 is turned a distance $\beta$, a stickman image seen by the secondary observer similarly rotates a distance $\beta$. Therefore, if the primary observer rotates the entire microscope within a fore and aft plane aligned with his or her body an arcuate distance $\beta$, the observer can now rotate rotary housing 256 so that the observer's eyes remain horizontal. When transverse eye piece axis 340 is oriented horizontally, the images viewed by the secondary observer are properly aligned.

Figure 14:
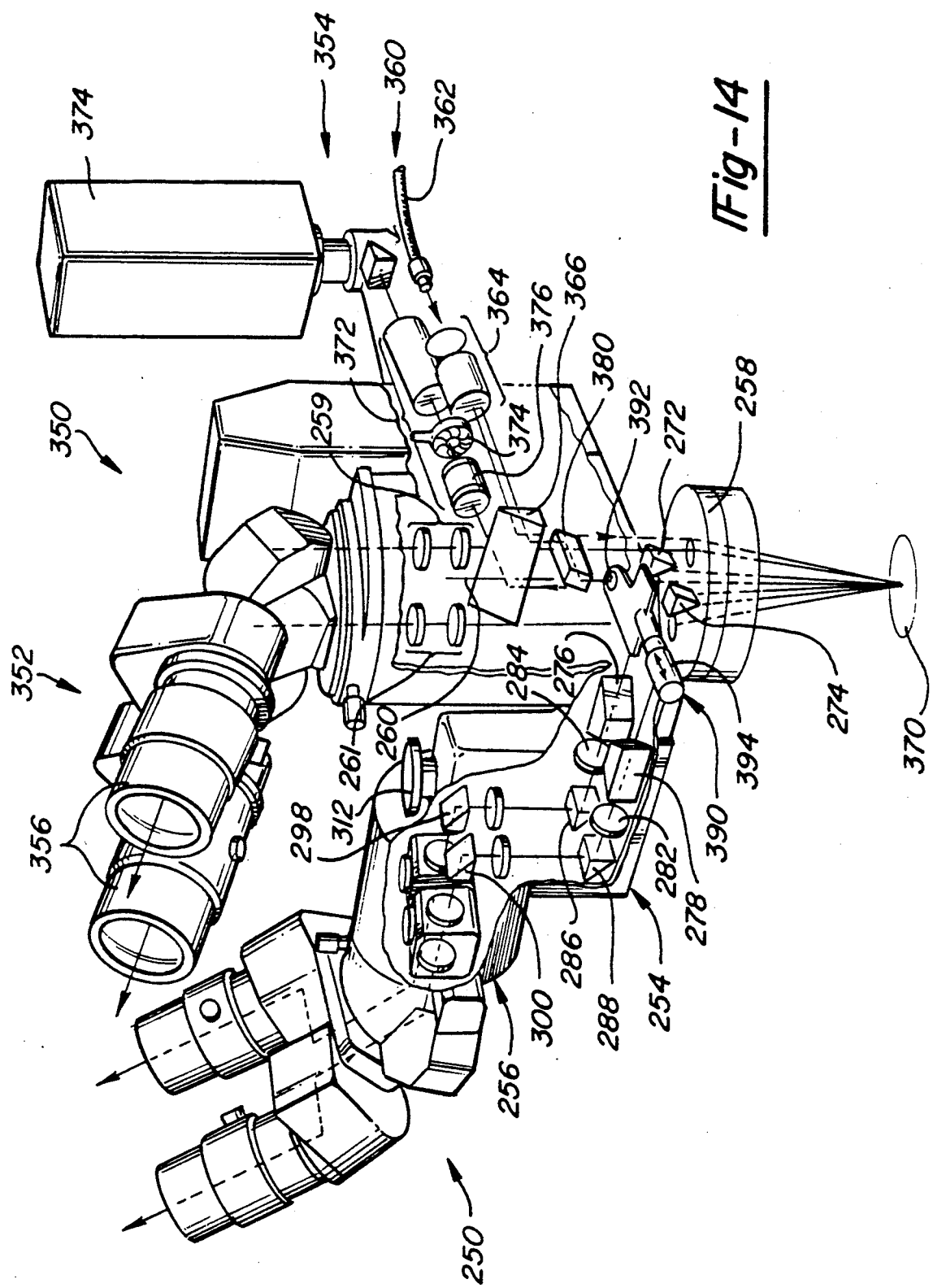
FIG. 14 is a schematic illustration of the optic system of the present invention illustrating additional features and advantages.

An alternate and enhanced microscope in accordance with the invention is shown in FIG. 14. The microscope system is designated generally by the reference numeral 350. The system generally includes a primary surgeon's microscope 352, an observer's secondary viewing station 250, and a documentation illumination module 354.

The primary microscope 352 is similar to that described above with reference to FIGS. 1-6 and/or FIGS. 7-13 and includes an objective lens 258, sets of laterally spaced lenses 259 and 261, and a set of stereo eye pieces 356. Any type of commonly used or known stereo microscope can be used in accordance with the present invention.

The secondary observer's viewing station 250 is the same as that described above with respect to FIGS. 7-13 and corresponding parts are given similar reference numerals in FIG. 14. Alternately, the secondary viewing station can be the same as viewing station attachment 100 shown and described above with reference to FIGS. 1-6.

The document illumination module 354 preferably is the same as the module and system illustrated and described in U.S. Pat. No. 4,856,873 which is assigned to the same assignee of the present application and invention. The disclosure of the '873 patent is herein incorporated by reference. It is also understood that other document illumination modules of standard or conventional type can be used which satisfy the objects of the present invention.

In the module 354, light from a light source 360 is transmitted through fiberoptic cable 362 to the module. The light is passed through a series of lenses 364 and a right angle prism 366 into and through the objective lens 258 to the field of view 370. Reflected light is transmitted back through the objective lens 258 and the prism 366 and passed through a focusing and shaping series of lenses 372 to a document recording mechanism 374. The recording device 374 can be a video camera, photographic camera, or the like. The reflected light path also passes through a manually-adjustable iris 374. The series of lenses 372 includes a Galilean infinity focal length multiplier 376 which is used to either reduce or increase the effective focal length depending on how the multiplier 376 is positioned in the module 354. With a Galilean multiplier., the image stays erect and does not invert or change. This is used to change the size of the image to compensate for the size of the camera or pick-up tube utilized in the recording device 374. This also prevents the surgeon or assistant from having to change the lenses on the camera in order to change the image size.

Positioned in the optic path between the light source 360 and field of view 370 is a red retina reflex enhancer 380. The enhancer is preferably a rhomboid prism and provides a reflection off the retina or other tissue in the field of view. This allows for a better and more visible field of view site for the surgeon to analyze and operate upon. Preferably, the enhancer 380 is positioned directly in line with the main axis 260 of the microscope system.

Figure 15:
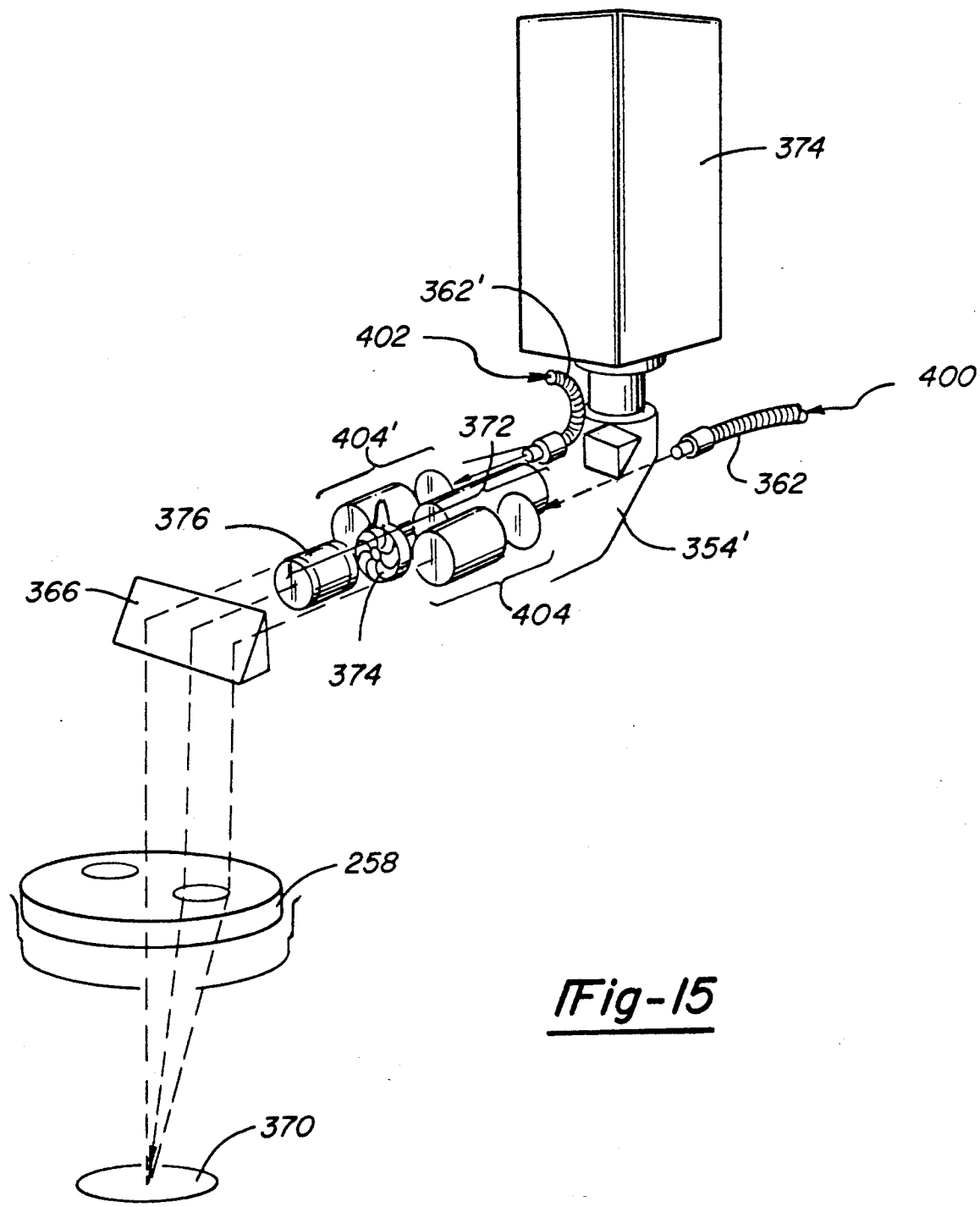
FIG. 15 is a schematic illustration of yet another embodiment of the invention.

The light source for the microscope system can be a single source as shown in FIG. 14, or it can comprise a pair of light sources 400, 402 (and appropriate lenses and size adjusters 404 and 404') positioned on opposite sides of the document recording optical path, as shown in FIG. 15. The light is transmitted by fiber optic cables 362 and 362' to the documentation illumination module 354'. The light passes through the series of lenses 404 and 404' and then through the prism 366 and objective lens 258. The transmission of reflected light from the field of view 370 through the module 354' to the recording instrument 374 is the same as that described above with reference to FIG. 14.

A fixation lens device 390 is also preferably provided with the present invention. The device 390 has a lens 392 and is positioned at a point in the main optical path (as shown in FIG. 14) perpendicular to the main axis 260 of the system. The fixation lens device is useful in many surgical procedures, particularly for the patient to train his or her eye upon when the surgeon requests it and/or the surgery necessitates it. A handle 394 is attached as part of the fixation lens device 290 and extends outside the housing (not shown) for manipulation by the surgeon or assistant.

The fixation lens is preferably a red filter (although filters of other colors and types could be utilized); and can be selectively positioned and removed from the main optical path depending on the needs and desires of the surgeon.

While the preferred embodiments of the invention are ideally suited for use in surgical procedures or the like where the primary user is assisted by the secondary observer, it should be noted that the microscope system is also useful in teaching applications. Where an assistant is to play an active role in the procedure, it is important that the assistant have proper orientation with the object and the primary user. If the secondary observer is sitting the right of the primary observer, than the image viewed should be rotated 90 degrees. In teaching applications, however, where the observer is passive, it may be desirable to allow a secondary observer to view the object from the perspective of the primary user. The microscope system of the present invention can be easily adapted to rotate the image 90 degrees by simply rotating the dove prisms 45 degrees in the appropriate direction.

The present invention has been described in an illustrative manner. It is to be understood that the terminology which has been used is intended to be in the nature of words of description rather than of limitation. Obviously, many modifications and variations of the present invention are possible in light of the above teachings. Therefore, within the scope of the appended claims, the present invention may be practiced otherwise than as specifically described.

What is claimed is:

1. A microscope system having primary and secondary binocular viewing stations which are rotatably positionable relative to one another for simultaneously viewing an object, said system comprising:
  a) an objective lens cooperable with the primary viewing station and oriented within a primary optic axis to focus a plurality of rays of light upon the object to be viewed;
  b) first light deflecting means for redirecting a pair of the rays of light from the objective lens orthogonally to form an orthogonal optic axis spaced transversely from the primary optic axis, wherein the primary and orthogonal optic axes perpendicularly intersect a transverse optic axis extending therebetween;
  c) second light deflecting means cooperable with the secondary viewing station for redirecting the pair of light rays in the orthogonal optic axis along a secondary viewing station optic axis, wherein said second light deflecting means is rotatable about the secondary viewing station optic axis which is spaced from and parallel to the transverse optic axis to allow the second viewing station to be rotated relative to the primary viewing station;
  d) means for compressing or stretching the paths of light in the orthogonal optic axis as the secondary viewing station is rotated; and
  e) means for rotating the images of the object viewed at the second viewing station to compensate for the image rotation which occurs when the primary and secondary viewing stations are rotated relative to one another.

2. The microscope system of claim 1 wherein said means for rotating the images further comprises a pair of image rotating optic elements aligned in the path of the rays of light in the transverse optic axis and a linkage coupling said image rotating optic elements to the secondary viewing station to cause the image rotating optic elements to rotate a distance which is sufficient to maintain the alignment of the image viewed at the secondary viewing station.

3. A microscope system of claim 2 wherein said image rotating optic elements comprise a pair of dove prisms.

4. The microscope system of claim 2 wherein the image rotating optic elements rotate the image passing therethrough an amount two times the rotation of the optic elements.

5. The microscope system of claim 1 wherein said secondary viewing station can be rotated through a range of plus or minus 40° when the primary viewing station is inclined in order to maintain the secondary viewing station in the vertical position and the image observed at the secondary viewing station in proper alignment.

6. A method of automatically orienting an image viewed by a secondary observer using a binocular microscope having primary and secondary binocular viewing stations which are rotatably shiftable relative to one another, comprising:
  a) providing an objective lens oriented within a primary optic axis for focusing a plurality of light ray pairs upon an object to be simultaneously viewed by a primary and secondary user;
  b) deflecting one pair of light rays from the primary optic axis perpendicular along a transverse axis and further deflecting the light ray pair perpendicular therefrom to form an orthogonal optic axis spaced from the primary optic axis;
  c) deflecting the pair of rays and the orthogonal optic axis along a second viewing station optic axis perpendicular thereto and aligned with the second viewing station axis of rotation;
  d) rotating a second viewing station about a second viewing station optic axis to maintain the secondary user's eyes horizontal as the primary user varies the inclination of the primary viewing station in a fore and aft plane; and
  e) automatically rotating the image observed by the secondary observer to maintain uniform orientation of the image at the secondary viewing station irrespective of the relative orientation of the primary and secondary viewing stations.

7. A microscope system comprising:
  a) primary and secondary binocular viewing stations which are rotatably positionable relative to one another for simultaneously viewing an object;
  b) means for compressing or stretching the paths of light to said viewing stations; and
  c) illumination means.

8. A microscope system as set forth in claim 7 further comprising documentation recording means.

9. A microscope system as set forth in claim 8 wherein said documentation recording means includes a focal length multiplier means.

10. A microscope system as set forth in claim 8 wherein said illumination means comprises a pair of separate light paths adjacent said documentation recording means.

11. A microscope system as set forth in claim 7 further comprising a fixation lens and a reflex enhancer.

* * * * *

UNITED STATES PATENT AND TRADEMARK OFFICE
CERTIFICATE OF CORRECTION

PATENT NO. : 5,052,789
DATED : October 1, 1991
INVENTOR(S) : Larry K. Kleinberg

It is certified that error appears in the above-identified patent and that said Letters Patent is hereby corrected as shown below:

Column 9, line 10; delete "206" and insert --306--.

Column 9, line 20; delete "290" and insert --294--.

Column 11, line 12; after "multiplier" delete --.--.

Signed and Sealed this

Twenty-fifth Day of January, 1994

Attest:

BRUCE LEHMAN

Attesting Officer    Commissioner of Patents and Trademarks